US011708704B2

(12) United States Patent
Aintabi

(10) Patent No.: US 11,708,704 B2
(45) Date of Patent: Jul. 25, 2023

(54) CANOPY FOR CLIMATE AND SOLAR MITIGATION

(71) Applicant: Jason Aintabi, New York, NY (US)

(72) Inventor: Jason Aintabi, New York, NY (US)

(73) Assignee: Vandewater Capital Holdings, LLC, New York, NY (US)

(*) Notice: Subject to any disclaimer, the term of this patent is extended or adjusted under 35 U.S.C. 154(b) by 71 days.

(21) Appl. No.: 17/237,738

(22) Filed: Apr. 22, 2021

(65) Prior Publication Data
US 2021/0332604 A1    Oct. 28, 2021

Related U.S. Application Data

(60) Provisional application No. 63/013,668, filed on Apr. 22, 2020.

(51) Int. Cl.
*E04H 15/04*    (2006.01)
*B64B 1/40*    (2006.01)
(Continued)

(52) U.S. Cl.
CPC ............ *E04H 15/04* (2013.01); *B64B 1/40* (2013.01); *G01W 1/02* (2013.01); *E04H 15/00* (2013.01); *Y02E 70/30* (2013.01)

(58) Field of Classification Search
CPC ........... E04H 15/04; E04H 15/00; B64B 1/40; G01W 1/02; Y02E 70/30
See application file for complete search history.

(56) References Cited

U.S. PATENT DOCUMENTS 3,337,162 A    8/1967    Bauserman
3,565,368 A    2/1971    Byron
(Continued)

FOREIGN PATENT DOCUMENTS

CA    2829781 A1    9/2012
CN    105626375 A    6/2016
(Continued)

OTHER PUBLICATIONS

Wikipedia (Hot Air Balloon, Wayback Machine, Feb. 9, 2020, https://web.archive.org/web/20200209113153/https://en.wikipedia.org/wiki/Hot_air_balloon) (Year: 2020).*
(Continued)

*Primary Examiner* — Daniel R Miller
*Assistant Examiner* — Christian T Bryant
(74) *Attorney, Agent, or Firm* — St Onge Steward Johnston and Reens LLC

(57) ABSTRACT

A sunshade device and management system for mitigating the effects of climate change and direct and prolonged exposure to the sun, the sunshade device including a reflective canopy attached to a collapsible web or frame structure. The sunshade device is positioned above the ground by a combination of lifting balloons and positioning machines for managing the elevation, shape and geolocation of the sunshade device. A sunshade management system controls the status of the sunshade device, and can collapse and ground the sunshade in the evening, or during rainy weather, or cloudy days, or when severe weather-related events, such as thunderstorms, tornados, hurricane, etc. are anticipated, and can relaunch the sunshade device when such conditions have passed.

18 Claims, 6 Drawing Sheets

(51) Int. Cl.
*G01W 1/02* (2006.01)
*E04H 15/00* (2006.01)

(56) References Cited

U.S. PATENT DOCUMENTS

| | | |
|---|---|---|
| D438,589 S | 3/2001 | Brown |
| D622,896 S | 8/2010 | Bear |
| 8,857,758 B2 | 10/2014 | Al-Garni et al. |
| 9,091,462 B2 | 7/2015 | Ratti et al. |
| 9,775,305 B2 | 10/2017 | Choi |
| 10,151,120 B1 | 12/2018 | Kaneshiro |
| D847,486 S | 5/2019 | Morel |
| D852,489 S | 7/2019 | Morel |
| 10,352,063 B2 | 7/2019 | Jensen |
| 2004/0075411 A1* | 4/2004 | Evans ............... G01P 5/12 318/481 |
| 2011/0315811 A1* | 12/2011 | Al-Garni ............ A45B 23/00 244/30 |
| 2012/0069464 A1 | 3/2012 | Murakami |

FOREIGN PATENT DOCUMENTS

| | | | |
|---|---|---|---|
| CN | 105775097 A | | 7/2016 |
| CN | 209883246 U | * | 1/2020 |
| GB | 2492806 A | | 1/2013 |
| KR | 102015787 B1 | * | 8/2019 |
| WO | 2018209454 A1 | | 11/2018 |

OTHER PUBLICATIONS

Wikipedia (Solar Balloon, Wayback Machine, Apr. 1, 2019, https://web.archive.org/web/20190401032428/https://en.wikipedia.org/wiki/Solar_balloon) (Year: 2019).*

* cited by examiner

CANOPY FOR CLIMATE AND SOLAR MITIGATION

FIELD OF THE INVENTION

The present invention relates to technology for climate change mitigation, forest fire prevention, and glacial and forest preservation. More specifically, the present invention provides a device and system to provide shade and reflect/absorb solar radiation on an adaptable and large-scale basis.

BACKGROUND OF THE INVENTION

Climate change has become a significant threat to both the natural environment and man-made structures and practices. Rising temperatures have resulted in melting of the polar ice caps and glaciers, causing rising sea levels. The melting ice caps threaten many major cities, communities, wildlife, and food sources. Higher temperatures have also resulted in increased droughts in parts of the world, impacting food production, but also leading to large accumulations of dead and dried-out plants and trees. Dry plant matter has served as fuel for large devastating fires in many parts of the world, including notably, in California and Australia.

Technologies such as green energy generation, carbon capture in fossil fuel power plants, and smart energy grid technologies are just a few examples of approaches that have been developed to combat the global climate change issue. These technologies are helpful in controlling worldwide climate change, by reducing carbon dioxide production, and thus reducing a significant driver of climate change. However, such technologies do not provide reduction of warming in particular locations.

A more localized approach for controlling climate change in specific locations is the use of sunshades and other shading technology to prevent solar heating of surface features.

Solar shades provided over surface features such as polar ice caps, glaciers, and the like, should reduce their surface temperatures and decrease their melting rate. Solar shades over open land areas such as forests, plains, and other areas subject to the risk of wild fires, should lower their ambient temperatures, allowing greater moisture retention, thereby reducing the fuel available for fires.

Previously proposed systems have never been successfully implemented in a large scale system. Small scale shades may be useful for urban and suburban environments, and some shade coverings have been used in farming. The use of large-scale, aerially suspended solar shading technology for large areas is extremely challenging due to environmental conditions, such as changing seasons, high winds, storms, and other climate-related events.

Accordingly, there remains a need for technology comprising effective materials that provides large-scale solar shading over significant size areas, capable of adapting to a changing environment and other, often unpredictable, climate events.

SUMMARY OF THE INVENTION

It is an object of the present invention to provide a large-scale sunshade comprising durable, sunlight reflective material. It is a further object of the present invention to provide a system for managing the geolocation, elevation and shape of the sunshade and adapting its use to environmental factors.

The present invention provides a sunshade device for mitigating the harmful effects of direct and prolonged sunlight. The device preferably includes a reflective canopy fitted to a collapsible frame or web structure. The frame or web preferably comprises a lightweight yet sturdy material. The outer perimeter of the frame may form any geometric shape, with the goal of providing large-scale shading over the earth's surface.

The collapsible web or frame allows the web or frame to fold and/or collapse in certain circumstances, such as in the event of a severe weather-related event, high winds, etc. Some embodiments also preferably provide joints in positions allowing for adapting the frame's geometric shape. Such adaptations may be determined by an external user or based upon particularly advantageous shapes given the patches registering the highest ground temperatures and other environmental considerations.

The reflective canopy is affixed to the web or frame structure to form the sunshade device. The reflective canopy preferably comprises a lightweight, reflective material. Materials such as reflective white or metallized plastic films and reflective metal foils are preferred, however, fabrics such as reflective white woven and non-woven fabrics may be used. In some embodiments, the reflective canopy is integral with or is part of the collapsible web or frame.

One or more lift balloons are affixed to the web or frame. The lift balloons may be solar balloons, which may have a dark energy absorbing coating or layer so they absorb the heat from the sun, heating gases in the balloon to cause them to become less dense than the air surrounding the solar balloons such that they float, elevating the sunshade device above the earth's surface. Desirably, means for inflating the lift balloons are provided so the lift balloons can be inflated to raise the sunshade device, and means for deflating the lift balloons are provided to vent the balloons to lower the sunshade device.

Also preferably included with the sunshade device are one or more positioning machines for managing the elevation, shape and geolocation of the sunshade device as well as adapting to changing weather patterns and weather-related events. The one or more positioning machines are affixed or otherwise attached to the web or frame. The positioning machines preferably include propellers and other features to help maintain the elevation and geolocation of the sunshade device. For example, one or more drone devices may be used as positioning machines. Some preferable embodiments of the positioning machines include energy panels to absorb solar energy, batteries and resistors to store the solar energy, and the like to power the associated positioning machines. Alternatively, the batteries, solar panels and other power related systems can be mounted to the web or frame. Those of ordinary skill in the art will understand the advantages and composition of energy-independent, self-sustaining positioning machines for use with the present invention.

To manage the positioning and adaptation functions of the positioning machines, preferable embodiments of the sunshade device further employ a sunshade management system. The sunshade management system preferably employs one or more sensors to record and assess changing weather patterns and other information. The management system is also preferably in electronic communication with the one or more positioning machines. The management system's one or more sensors preferably include information on wind speed, direction, and variation, intensity of the sun's rays and angle of the sun, ambient temperature and humidity, barometric pressure, geolocation and elevation from the earth's surface, temperature and humidity at the earth's surface, precipitation status, levels, and intensity, and other maintenance related information, such as damage to the sunshade's canopy or frame, low-power or malfunctioning positioning machines, etc.

The sunshade management system may then use the information gathered by the one or more sensors and/or other data stored in or received by the management system to change the status of the sunshade device. For example, it is likely to be preferable to collapse and ground the sunshade in the evening and only launch it again after sunrise. Similarly, it is likely to be desirable to collapse and ground the sunshade during rainy days and/or cloudy days, and only launch it again when clouds have cleared. It is also very likely that it will be necessary to collapse and ground the entire device when severe weather-related events, such as thunderstorms, tornados, hurricanes, etc. are anticipated. When these weather disturbances have passed, the sunshade device may be relaunched.

The management system will therefore control the positioning of the sunshade via the lift balloons and positioning machines, and will hold the sunshade device substantially in place so that it can continue to perform its climate change mitigation functions when conditions are appropriate. However, the management system will be able to ground the sunshade device according to a predetermined schedule, or on an expedited basis when needed due to sudden and severe weather-related events or emergencies. After conclusion of the event or emergency, the management system can evaluate and determine whether to re-elevate the sunshade device.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

Figure 1:
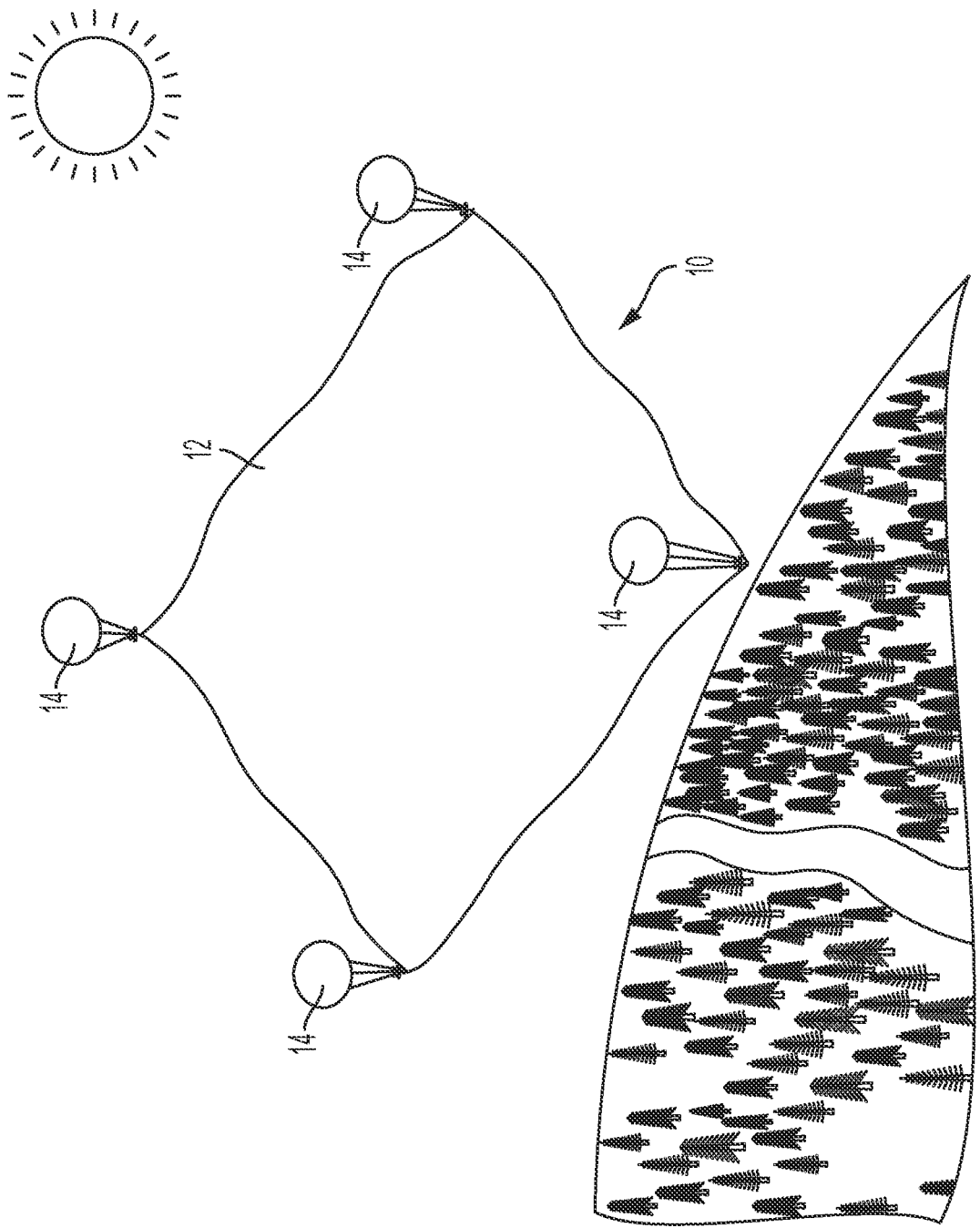
FIG. 1 depicts a perspective view of an exemplary sunshade device in use at an elevation above the earth's surface according to present invention.

Referring first to FIG. 1, an embodiment of the present invention in use at an elevation above the earth's surface is illustrated. In the instance depicted in FIG. 1, a sunshade device 10 is used to shade a portion of landscape containing a forest, cooling the local environment and reducing heating and drying out of forested areas. The sunshade device 10 includes a reflective canopy 12 and lifting balloons 14 to assist with maintaining the canopy's elevation. The reflective canopy 12 preferably comprises a lightweight, reflective material. Materials such as reflective white or metallized plastic films and reflective metal foils are preferred, however, fabrics such as reflective white woven and non-woven fabrics (such as a white fabric or a white knitted material). The reflective canopy 12 may be a solid sheet material or a perforated or otherwise discontinuous sheet material. For example, the canopy may comprise a film, or a perforated film, or a non-woven or knitted white fabric. In some embodiments, the canopy 12 may include embedded plant materials such as an algae or plants such as Tillandsia which does not have a root system. Such plant materials would serve to reduce carbon dioxide in the atmosphere, however, the additional weight of the plant matter may interfere with the mobility of the sunshade device 10.

Lifting balloons 14 are filled with lighter than air gases. In some embodiments, lifting balloons 14 are helium or hydrogen filled balloons, in other embodiments they are hot air filled balloons. The balloons 14 may be provided with a dark radiation absorbing coating to increase the heat absorption of the balloon to heat gases contained in the balloon. The dark energy absorbing coating or layer for absorbing solar radiation and heating gases in the balloon will cause the sunshade device to float above the earth's surface. The lifting balloons 14 have means for inflating the balloons so the balloons 14 can be inflated for use, and means for deflating the balloons so the balloons 14 can be stored during weather events.

Figure 2:
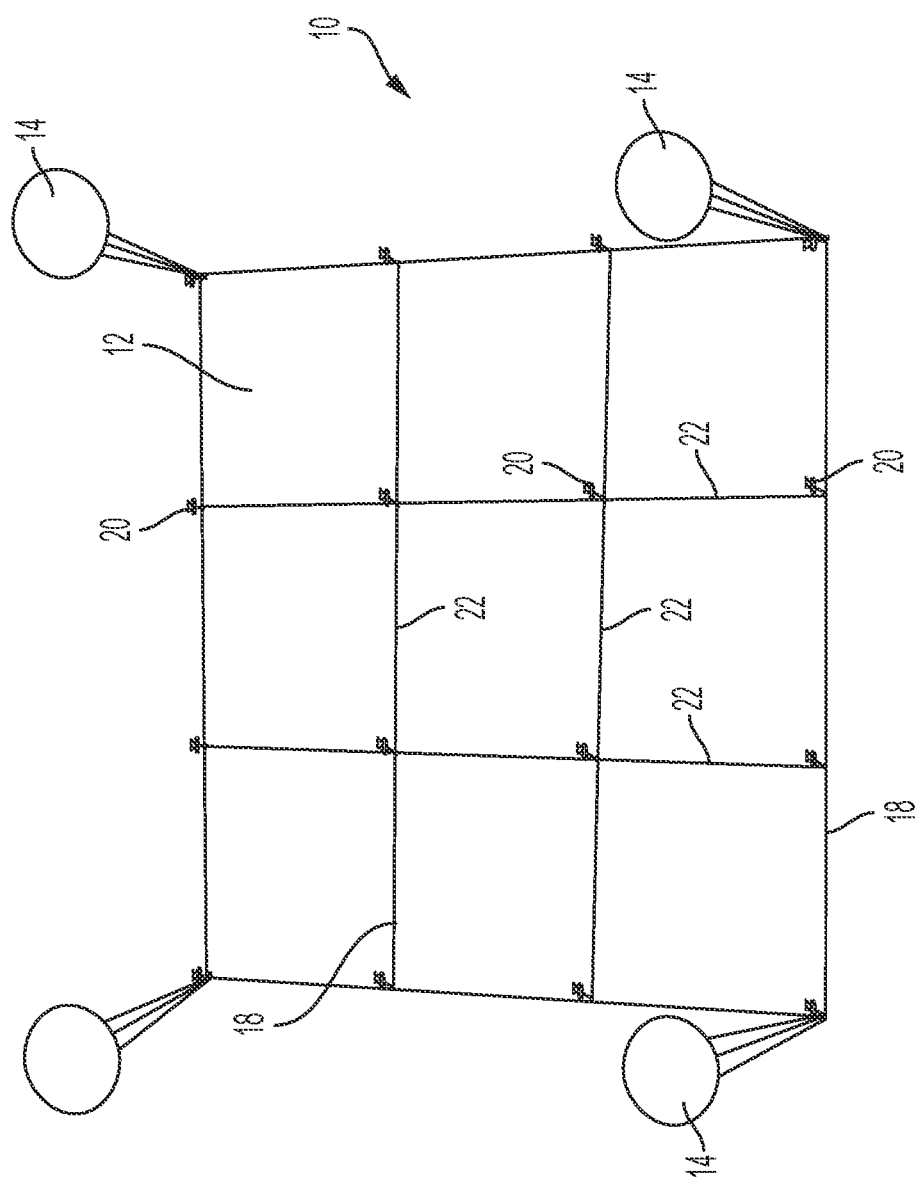
FIG. 2 depicts a perspective view of another exemplary sunshade device structure according to the present invention.

Sunshade device 10 is provided with a collapsible web or frame structure with metal attachment points for the lifting balloons 14 and positioning machines 20 discussed hereafter and the reflective canopy 12. The collapsible web or frame can be a lightweight metal frame 18 as seen in FIG. 2. In such case, the metal frame may constitute aluminum, titanium, or steel. The collapsible qualities of the frame 18 may be provided by articulated joints or by nesting frame parts or other parts received within each other.

Figure 5:
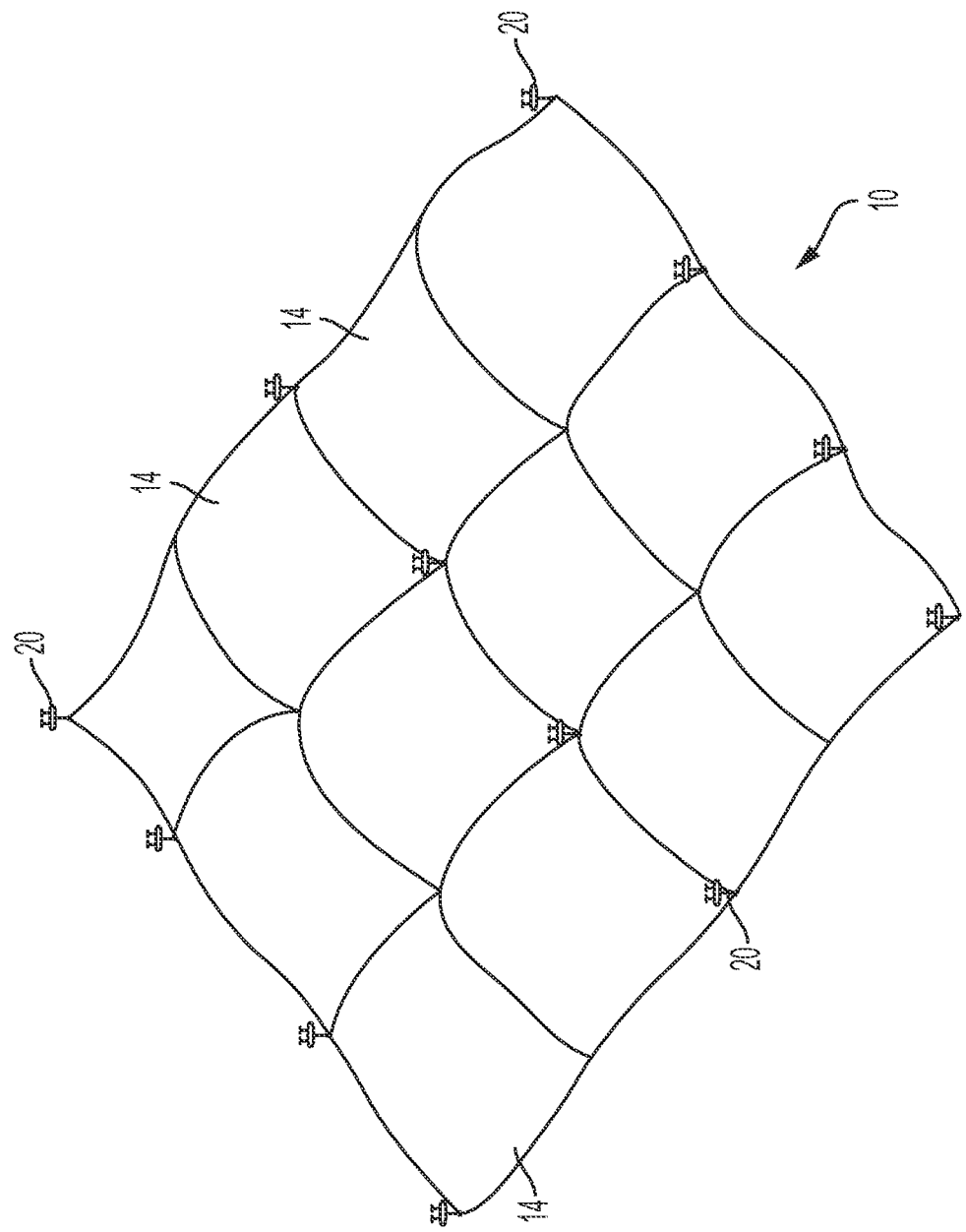
FIG. 5 depicts a perspective view of an exemplary sunshade device according to the invention.

The sunshade device 10 in FIG. 2 has lifting balloons 14 at the four corners of a frame 18. Frame 18 includes internal frame elements 22 that divide the frame into nine sub-areas as shown. Positioning machines 20 are located at the intersections of the internal frame elements. Preferably the internal frame elements 22 are connected by movable, pivotable connecting joints that allow the frame 18 to be collapsed into a smaller area. In some preferable embodiments, portions of the frame structure can also be lengthened or shortened at the joints to facilitate changes to the shape. The sunshade device 10 in FIG. 5 has lifting balloons 14 embedded in the frame 18.

Figure 4A:
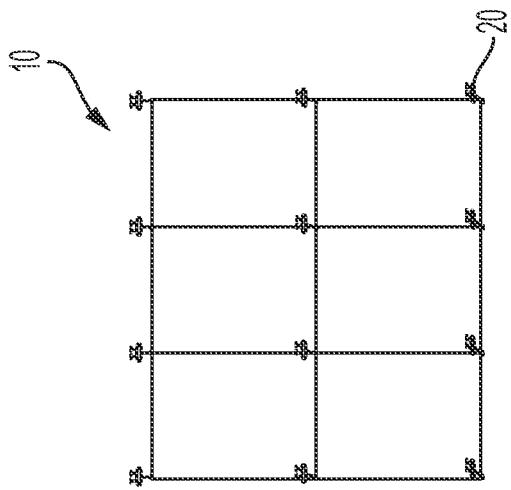
FIGS. 4A-4F depict top views of various exemplary frame structures for a sunshade device according to the invention.
Figure 4B:
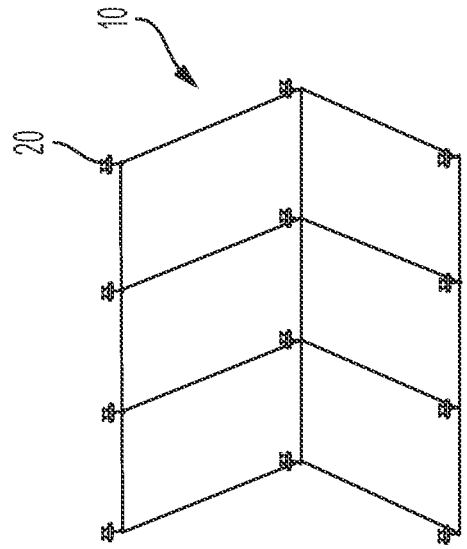
Figure 4C:
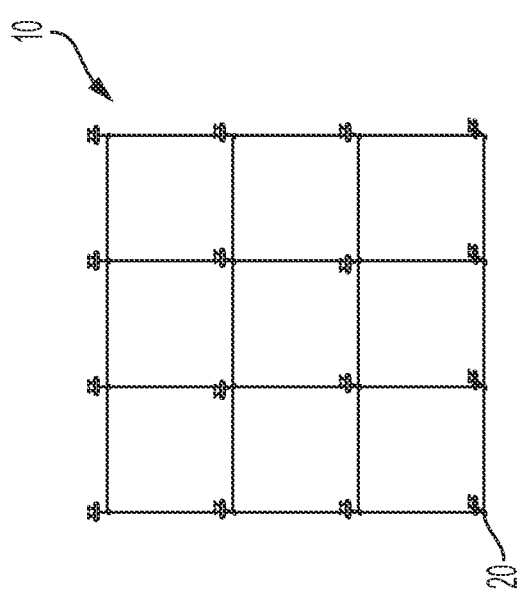
Figure 4D:
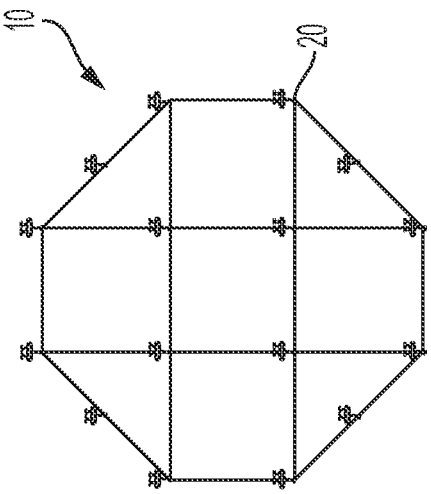
Figure 4E:
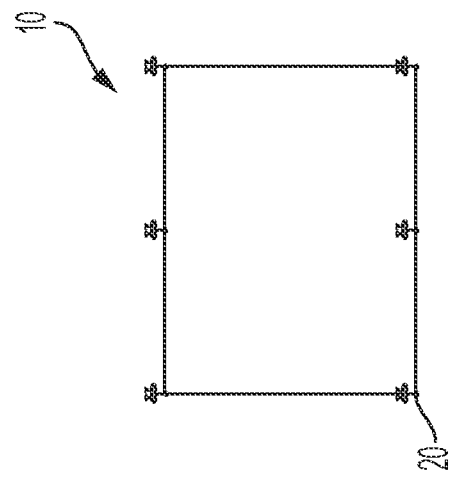
Figure 4F:
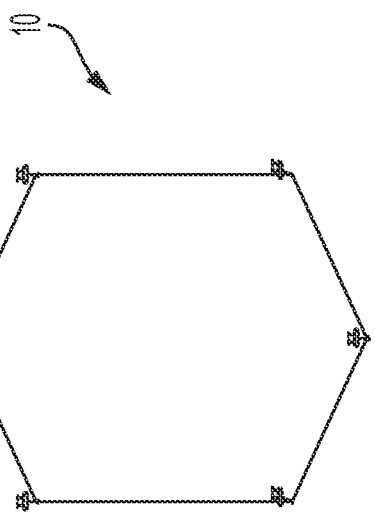

Frame 18 may be arrayed in any number of shapes, such as the rectangular or square shape shown in FIG. 2, or it may be provided in another quadrilateral or hexagonal, octagonal, or other polygonal shape, as depicted in the exemplary instances in FIG. 4A-4F. The exemplary frame structure shown in FIGS. 4A and 4B can be rearranged between a rectangular arrangement and a polygonal arrangement with six sides that resembles an arrow. Likewise, the exemplary frame structure in FIGS. 4C and 4D is modifiable between a rectangular arrangement and an octagonal arrangement and the exemplary frame structure in FIGS. 4E and 4F is modifiable between a rectangular arrangement and a hexagonal arrangement. In each case, positioning machines located at the various joints of the frame structure facilitate the modification of the frame structure's shape.

Preferable embodiments of the frame 18 are provided with features to facilitate folding and collapsing the canopy. For example, the various joints in the frame structure preferably allow the frame structure to fold over upon itself. Likewise, preferable embodiments of the frame structure may include coiling functionality at the joints, which allow the frame structure to shrink to reduce the canopy's footprint. Such preferable embodiments employ flexible material for the frame structure that can be manipulated, bent, coiled, etc. where necessary. Such actions are preferably determined by the management system 510 and executed by the positioning machines. These same features also facilitate collapsing and/or grounding the sunshade device during severe weather events, as will be understood by those of ordinary skill in the art.

In another embodiment frame 18 may constitute a rigid perimeter of the sunshade 10 and internal frame elements 22 may be flexible metal cable or wire. In another embodiment frame 18 may constitute a flexible perimeter of the sunshade 10, for example, a metal cable, and internal frame elements 22 may be flexible metal cable or wire.

In another embodiment, a web 118 may be formed of metal or plastic cable or wire, similar to a woven netting. In some such cases, the web 118 and the reflective canopy 12 are provided in the same element, a reflective woven net.

In some embodiments, the collapsible web or frame structure comprises an inflatable web structure 218. The inflatable web structure 218 may be filled with lighter than air gases or with air that is heated by solar heating or internal heating. In such embodiments, the lift balloons 14 may be contained within the web structure 218 instead of being provided at attachment points at the perimeter of a frame. The collapsible web structure may in such case comprise a woven or non woven or film material.

Figure 3:
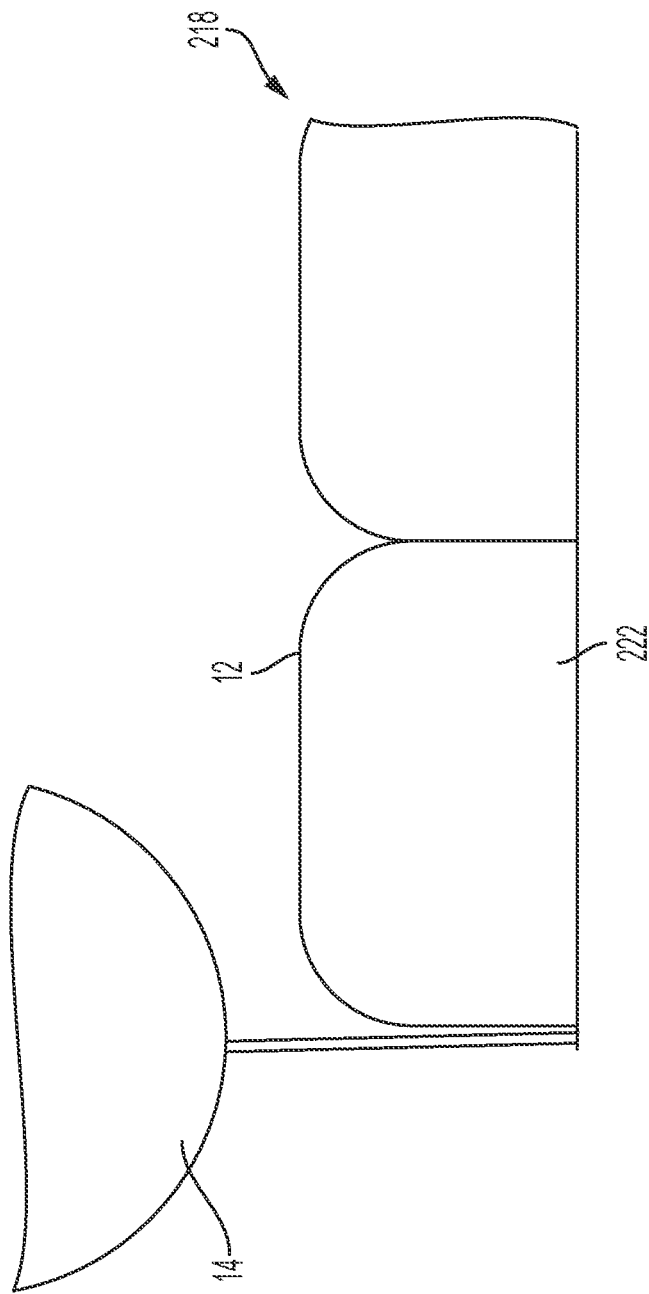
FIG. 3 depicts a partial side view of another exemplary sunshade device according to the principals and embodiments of the present invention.

Referring now to FIG. 3, an embodiment of an inflatable web structure 218 is shown. In FIG. 3, longitudinal tubes 222 are inflatable to form the web structure 218, and tubes 222 have an upper surface formed of a white reflective fabric providing the reflective canopy 12. On other embodiments, an inflatable web structure may be generally round, with an inflatable rim and radial tubes, with a reflective canopy located in a web between the radial tubes and rim.

The present invention also preferably includes one or more positioning machines 20 located to effectively manipulate the sunshade device 10 in order to re-position it, change its shape, or fold it or ground it in the case of an impending or present severe weather condition. The positioning machines 20 implement the instructions from the management system 510 to effectively maintain the operability and efficacy of the sunshade device 10. The positioning machines 20 are preferably located at strategic positions in the sunshade device 10 to accomplish their function. For example, a single properly located positioning machine 20 may be capable, in conjunction with the other features of the sunshade, of executing the management system's 510 positioning instructions. Positioning machines 20 may also be provided at the corners of the canopy 12, spaced along its perimeter, and/or positioned at particular joints in the frame structure 18, as depicted in the figures. The use of multiple positioning machines 20 may improve the flexibility of the sunshade 10 and management system 510 to manipulate the canopy 12 and frame structure 18. Preferably, the positioning machines 20 comprise one or more propeller-driven drone devices. Preferably, a rechargeable battery power system for powering the positioning machines 20 is provided, and includes a solar panel system for charging the battery power system.

Figure 6:
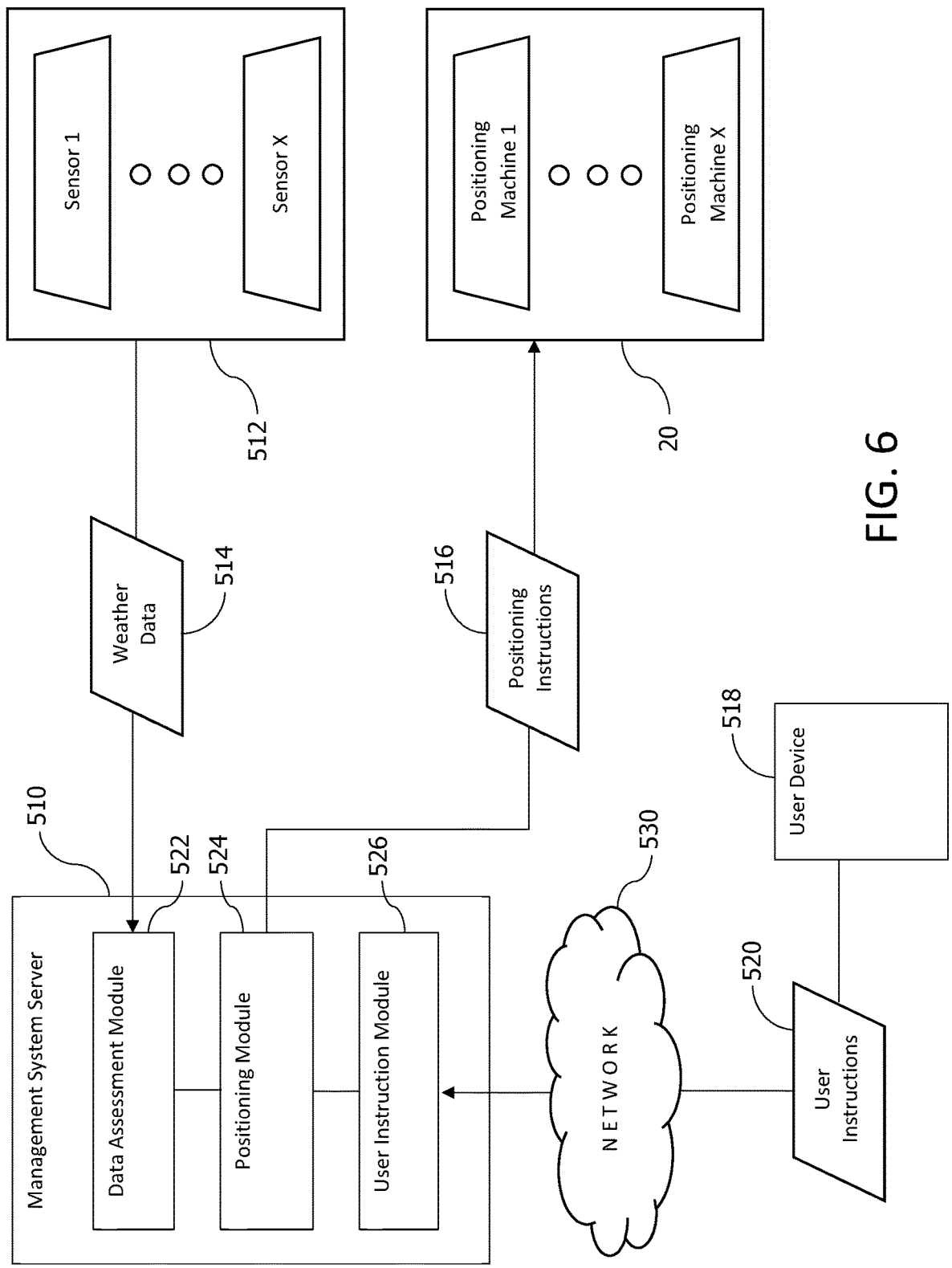
FIG. 6 depicts a schematic representation of an exemplary management system according to the principals and embodiments of the present invention depicted in FIGS. 1-5.

FIG. 6 depicts a schematic representation of the present invention's management system 510. Preferable embodiments of the management system 510 interpret weather data 514 provided by one or more sensors 512 to determine the best positioning for the canopy 12 and whether extreme weather conditions are present or imminent and require grounding or otherwise re-positioning the canopy 12. The one or more sensors 512 are preferably distributed at various strategic locations on the canopy 12 itself, the frame structure 18, the positioning machines 20, and/or the solar balloons 14 extending above the canopy 12, in certain embodiments. Additional sensors 512 are preferably included at or near the earth's surface, for example hanging down from the underside of the sunshade device 10 or provided on the anchors in embodiments that include anchors attached to the ground.

The sensors 512 preferably collect and transmit weather related data 514 and information, including information on wind speed, direction, and variation, intensity of the sun's rays and angle of the sun, ambient temperature and humidity, barometric pressure, geolocation and elevation from the earth's surface, temperature and humidity at the earth's surface, and precipitation status, levels, and intensity, among other informative data as will be apparent to those of ordinary skill in the art. In one embodiment, one or more sensors 512 are provided with the sunshade device 10 for sensing one or more of altitude and elevation from the earth's surface, air temperature, barometer pressure, humidity, wind speed and direction, GPS signals, web or frame status, solar intensity and angle, temperature and moisture levels at the earth's surface, and ambient precipitation.

Preferable embodiments of the sensors 512 and management system 510 also detect and transmit maintenance related data and information, such as damage to the sunshade's canopy 12 or frame structure 18, deflated or ineffective solar balloons 14, low-power or malfunctioning positioning machines 20, etc. The management system 510 then uses the data and information collected by and transmitted from the sensors 512 to make real-time determinations about the positioning and effectiveness of the sunshade device 10. In the case of extreme weather events, the management system 510 may also determine that the sunshade 10 should be folded up, grounded, or otherwise protected until the severe weather event ends.

The management system 510 preferably employs a data assessment module 522 to obtain the weather data 514 and related information from the sensors 512, perform an analysis of the present environment and anticipated future environment based upon the weather data 514, and determine the optimal course of activities for the sunshade device 10. The data assessment module 522 preferably performs these functions on a continuous and real-time basis such that the management system 510 is constantly reconsidering the optimal placement, shape, etc. for the sunshade device 10.

In some preferable embodiments, the management system also performs machine learning to optimize its own performance. For example, upon receipt of weather data 514 indicating the presence of extreme weather, the data assessment module 522 may determine a particular course of action that results in a suboptimal result, such as damage to a portion of the canopy 12, one or more of the solar balloons 14, or one or more of the positioning machines 20. Such damage is preferably identified by the one or more sensors 512 and relayed to the data assessment module 522 through the weather data 514 and associated information. The data assessment module 522, in such preferable embodiments, is capable of determining that its determination of an optimal course of action was incorrect or was delayed, and will therefore react differently in the future upon receipt of the same weather data 514 indicating the presence of extreme weather. In this way, the management system's 510 performance can be improved the longer the sunshade device 10 remains deployed and the associated management system 510 remains active.

Using the weather data 514 received from the sensors 512, preferable embodiments of the management system 510 generate positioning instructions 516 and transmit those instructions to the positioning machines 20. The instructions 516 can alter the shape or structure of the canopy's frame 18, can alter the angle or elevation of the sunshade device 10, can reduce the footprint of or ground the sunshade device 10, or re-position or otherwise alter the sunshade device 10. The instructions 516 are preferably executed by the positioning machines 20 in real-time such that data is recorded and transmitted by the sensors 512 and analyzed and interpreted by the management system 510 to generate positioning instructions 516, and those positioning instructions 516 are then executed by the positioning machines 20 all immediately, continuously, and in real-time.

Preferable embodiments of the management system 510 include a positioning module 524 to communicate with the data assessment module 522 and to generate appropriate positioning instructions 516 for the positioning machines 20. Like the data assessment module 522, the positioning module 524 preferably performs its functions on a continuous and real-time basis such that the management system 510 is constantly repositioning the positioning machines 20 and sunshade device 10 for optimal performance. Also like the data assessment module 522, the positioning module 524 benefits from the machine learning of some preferable embodiments of the management system 510 such that the positioning module 524 generates more and more optimal positioning instructions 516 the longer the sunshade device 10 remains deployed and the associated management system 510 remains active.

In some preferable embodiments, user input may further be provided over a network. User input may, for example, instruct the management system 510 to generate positioning instructions 516 to form a particular shape of the frame 18 structure or to ground the sunshade device 10 for maintenance. The user instructions 520 may be used to improve the efficacy of the sunshade device 10 or for other, non-functional reasons, such as to form a shape in celebration of or as a memorial to a certain event or holiday. Some preferable embodiments of the sunshade device 10 may also display certain messages, colors, patterns, etc. on the underside of the canopy. In such embodiments, the management system 510 may alter such underside display on the basis of user input.

Some preferable embodiments of the management system 510 employ a user instruction module 526 to obtain, parse, and communicate the user instructions 520 with the other components of the management system 510. Such embodiments provide for fluid and optimized functionality of the management system 510 by compartmentalizing the data analysis and instruction generation functions of the management system 510.

In the event of present or imminent severe weather, the management system 510 preferably acts to protect and preserve the sunshade device 10 by taking appropriate action. Such actions may include folding and collapsing the sunshade device 10 but maintaining its elevation, grounding the sunshade device, or a combination. Such actions may also include moving the sunshade device 10 or increasing or reducing its elevation to avoid the severe weather.

Preferable embodiments of the management system 510 are thus in electronic communication with the positioning machines 10, whether directly or over a network connection 530. The positioning machines 20 are preferably capable of identifying their geolocations, moving to an identified geolocation, maintaining and changing their own elevation and the sunshade's 10 elevation, and running for extended periods at low energy. The positioning machines 20 are also preferably energy independent and include solar panels, resistors, and batteries for collecting and storing solar energy. This allows the positioning machines 20 to run independently and for extended periods, as is necessary to accomplish their purpose. In some preferable embodiments, the management system 510 may also deactivate certain positioning machines 20 or reduce their energy output when they are not needed to move or maintain the sunshade device's 10 position. For example, in ideal weather, the sunshade device's 10 solar balloons 14 may be capable of maintaining the sunshade's 10 elevation, and the positioning devices 20 are not needed or only minimally needed to maintain the sunshade's 10 geolocation.

Accordingly, the sunshade device management system 510 is capable of: controlling the state of collapse or extension of the web or frame 18 via control of the positioning machines 20; controlling the elevation and geolocation positioning of the sunshade device 10; and determining if grounding of the sunshade device 10 is necessary due to one or more of weather, safety, and battery power of the sunshade device 10. The sunshade device management system 510 preferably performs each of these functions on a continuous, real-time basis and preferably learns from past assessments and instructions to improve its performance over time. The sunshade device management system 510 may further comprise: means for receiving weather forecast data, and based on the weather forecast data, controlling the elevation and geolocation positioning, the state of collapse or extension of the web or frame 18, and grounding of the sunshade device 10.

The present invention's goal is to provide a sunshade device 10 with little to no energy footprint that can be strategically deployed to mitigate the harmful effects of climate change over large portions of the earth's surface. Those of ordinary skill in the art will recognize the efficacy of the embodiments described herein for accomplishing the present invention's objectives. While the invention has been described with reference to particular embodiments and arrangements of parts, features, and the like, it is not limited to these embodiments or arrangements. Indeed, modifications and variations included in these teachings will be ascertainable to those of skill in the art.

What is claimed is:

1. A sunshade device for mitigating the harmful effects of direct and prolonged exposure to the sun, comprising:
 a sunshade device having:
  a collapsible web or frame structure;
  a reflective canopy provided with the web or frame structure;
  one or more lift balloons attached to the web or frame structure; and at least one positioning machine attached to the web or frame structure:
one or more sensors provided with the sunshade device for sensing one or more of altitude and elevation from the earth's surface, air temperature, barometer pressure, humidity, wind speed and direction, GPS signals, web or frame status, solar intensity and angle, temperature and moisture levels at the earth's surface, and ambient precipitation; and
a sunshade device management system for controlling the state of collapse or extension of the web or frame via control of the positioning machines, controlling the elevation and geolocation positioning of the sunshade device, and determining if grounding of the sunshade device is necessary due to one or more of weather, safety, and battery power of the sunshade device, and having means for receiving weather forecast data, and based on the weather forecast data, controlling the elevation and geolocation positioning, the state of collapse or extension of the web or frame, and grounding of the sunshade device.

2. The sunshade device of claim 1, wherein the sunshade device further comprises:
a rechargeable battery power system for powering the at least one positioning machine; and
a solar panel system for charging the battery power system.

3. The sunshade device of claim 1, wherein the collapsible web or frame structure comprises a metal framework.

4. The sunshade device of claim 1, wherein the collapsible web or frame structure comprises an inflatable web structure.

5. The sunshade device of claim 4, wherein the inflatable web structure contains the lift balloons within the web structure.

6. The sunshade device of claim 1, wherein the lift balloons comprise solar balloons having a dark energy absorbing coating or layer for absorbing solar radiation and heating gases in the balloon to cause the sunshade device to float above the earth's surface.

7. The sunshade device of claim 1, wherein the lift balloons in the inflatable web structure have a dark energy absorbing coating or layer for absorbing solar radiation.

8. The sunshade device of claim 1, wherein the one or more positioning machines comprise one or more propeller-driven drone devices.

9. The sunshade device of claim 1, wherein the lift balloons have means for inflating the balloons so the balloons can be inflated for use, and means for deflating the balloons so the balloons can be stored in the event of weather events.

10. The sunshade device of claim 1, wherein the reflective canopy comprises a reflective and/or metallized plastic film or a reflective metal foil or a reflective woven or non-woven fabric.

11. A sunshade device and management system for mitigating the harmful effects of direct and prolonged exposure to the sun, comprising:
a collapsible frame structure comprising joints, the joints being positioned to facilitate collapsing the collapsible frame structure and to facilitate the formation of a geometric shape of an outer perimeter of the frame structure;
a reflective canopy fitted to the collapsible frame structure;
a management system for controlling the state of collapse or extension of the frame structure via control of positioning machines and for controlling the elevation and geolocation positioning of the frame structure and determining if grounding of the frame structure is necessary;
a positioning framework comprising the positioning machines mechanically attached to the frame structure and in electronic communication with the management system, the positioning machines each including one or more positioning features, and the positioning framework acting to maintain an elevation and a geolocation of the sunshade device and the geometric shape of the frame structure's outer perimeter;
solar balloons attached to the frame structure;
one or more sensors detecting information relating to at least one of wind speed and direction, intensity of the sun's rays and angle of the sun, ambient temperature, barometric pressure, geolocation and elevation from the earth's surface, temperature and moisture levels at the earth's surface, precipitation status, levels, and intensity, and maintenance related information;
wherein the one or more sensors continually record and transmit the detected information to the management system, and the management system assesses the information from the one or more sensors in real-time and instructs the at least one positioning machine to control the elevation and geolocation positioning of the sunshade, the state of collapse or extension of the frame structure, and grounding of the sunshade device in the event of a weather-related event indicated by the detected information.

12. The sunshade device and management system of claim 11, wherein the weather-related events include current or impending excessive precipitation, tornado, hurricane, or otherwise unusually high winds.

13. The sunshade device and management system of claim 11, wherein the management system instructs the positioning framework to collapse and ground the sunshade device upon detection of a maintenance-related issue.

14. The sunshade device and management system of claim 11, wherein the management system instructs the positioning framework to change the geometric shape of the frame structure's outer perimeter upon instruction from a user over a network.

15. The sunshade device and management system of claim 11, wherein the positioning machines are drone devices.

16. The sunshade device and management system of claim 11, wherein the frame structure comprises carbon steel wire.

17. The sunshade device and management system of claim 11, wherein the canopy comprises a reflective metallized plastic foil or metal foil type material.

18. The sunshade device and management system of claim 11, wherein the solar balloons absorb thermal radiation from the sun, heating the fluid within and causing the one or more solar balloons to elevate the sunshade device.

* * * * *